(12) United States Patent
Herrmann

(10) Patent No.: US 6,174,091 B1
(45) Date of Patent: Jan. 16, 2001

(54) FIBER-OPTIC CONNECTOR

(75) Inventor: Richard Herrmann, Bensheim (DE)

(73) Assignee: Tyco Electronics Corp., Wilmington, DE (US)

( * ) Notice: Under 35 U.S.C. 154(b), the term of this patent shall be extended for 0 days.

(21) Appl. No.: 09/203,031

(22) Filed: Dec. 1, 1998

(30) Foreign Application Priority Data

Dec. 2, 1997 (DE) .............................................. 197 53 432

(51) Int. Cl.⁷ ..................................................... G02B 6/36
(52) U.S. Cl. ................................................. 385/81; 385/62
(58) Field of Search ........................................ 385/81, 62

(56) References Cited

U.S. PATENT DOCUMENTS

| | | | |
|---|---|---|---|
| 4,741,590 | 5/1988 | Caron | 350/96.21 |
| 4,896,938 | 1/1990 | Mathis et al. | 350/96.21 |
| 5,737,463 | * 4/1998 | Weiss et al. | 385/65 |
| 5,748,818 | * 5/1998 | Weiss et al. | 385/65 |
| 6,045,270 | * 4/2000 | Weiss et al. | 385/65 |

FOREIGN PATENT DOCUMENTS 0 347 118  12/1989  (EP) ................................. G02B/6/38

OTHER PUBLICATIONS

Copy of German Search Report.

* cited by examiner

*Primary Examiner*—Frank G. Font
*Assistant Examiner*—Reginald A. Ratliff

(57) ABSTRACT

A fiber-optic connector having a transparent connector housing, having a fiber receptacle hole for receiving a fiber-optic cable end which has an insulating sheath and an optical waveguide, the connector housing having an opening which extends transversely with respect to the fiber receptacle hole and is connected thereto, the connector including a fiber holding clip that can be introduced through the opening in order to retain the fiber-optic cable end, that is positioned against a stop, the fiber holding clip being pretensioned in such a way that the fiber-optic cable end is guided in follow-up fashion against the stop in the event of length variations.

8 Claims, 2 Drawing Sheets

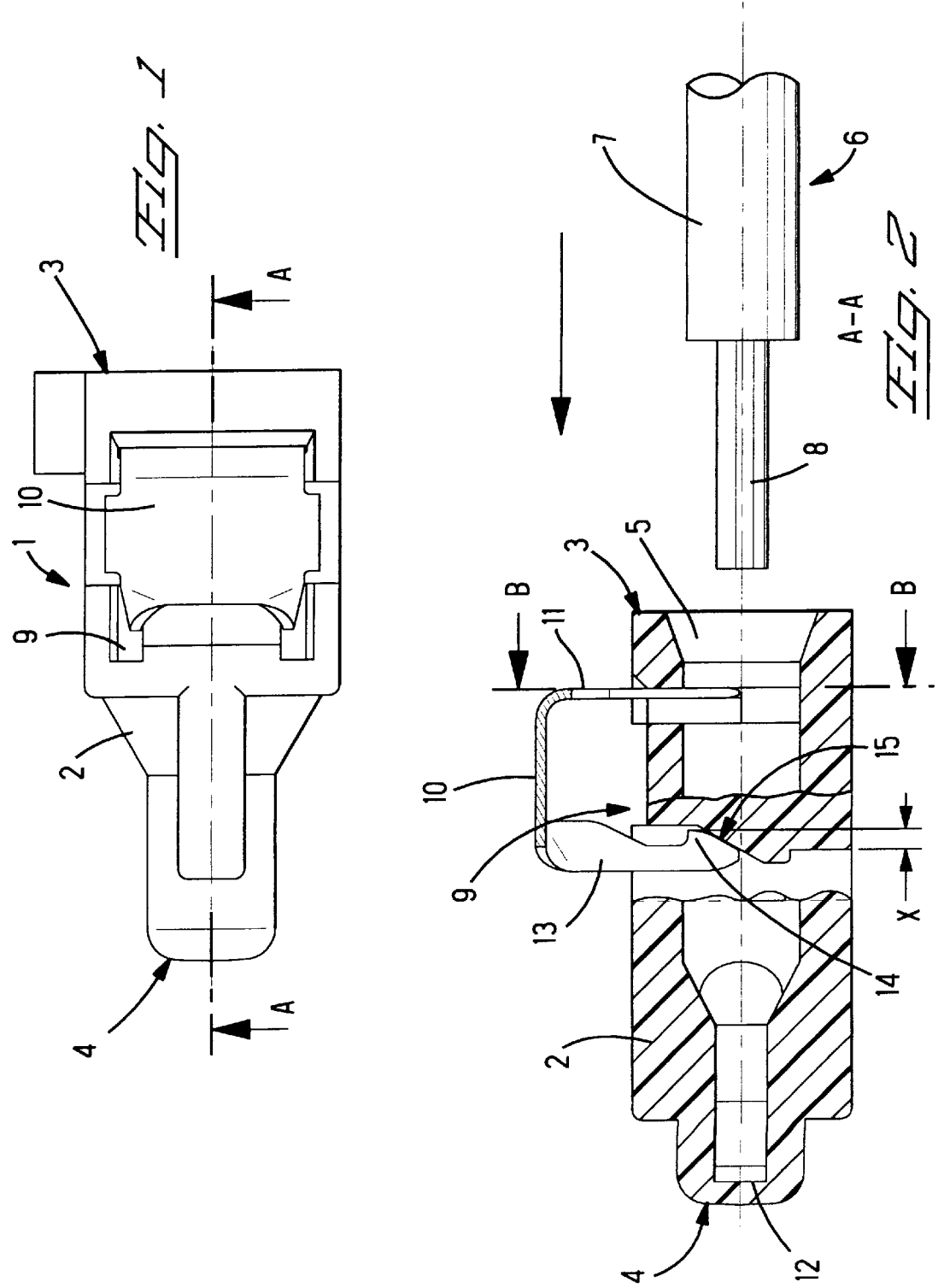

B-B

FIBER-OPTIC CONNECTOR

BACKGROUND OF THE INVENTION

1. Field of the Invention

The invention relates to a fiber-optic connector having a connector housing and a fiber holding clip, which can be introduced into the connector housing in order to retain a fiber-optic cable.

2. Description of the Prior Art

A fiber-optic connector such as this is disclosed in EP 347 118 B1. The described connector has an opaque connector housing with a through hole which is closed off at the end by a fiber element. An index matching gel is situated between this fiber element and the fiber-optic cable end for the purpose of refractive index matching. It is also possible to provide a blind hole instead of the fiber element in the connector housing. The blind hole serves as fiber receptacle and the gel is introduced into the said hole for the purpose of refractive index matching. The fiber end then butts directly against the transparent material of the connector housing at the bottom of the receptacle, which also forms the end surface of the connector.

Given a quality fiber end surface, it is equally possible for the gel to be dispensed with and for the fiber end surface to make direct contact with a complementary element, through a through hole in the connector housing.

Since optical fibers, in particular plastic fibers, are also subject to aging, shortening of the fibers in the connector can occur. This can result in an air-gap spacing between the fiber end surface and the stop formed in the connector housing material or the complementary element. Such an air gap leads to increased attenuation in the transmission of light.

SUMMARY OF THE INVENTION

The object of the invention is to configure a fiber-optic connector in such a way that the fiber-optic cable end can be maintained in abutting contact in the event of fiber length variations.

The object is achieved by means of a connector having a fiber holding clip that retains the fiber in a connector housing and biases the fiber towards an end of the housing.

In many fiber-optic connectors, this object is achieved by an additional helical spring for applying a spring force in the axial direction to the fiber end. This ensures that the fiber end buts against a predetermined stop or the complementary element. However, the design of these fiber-optic connectors is often very complicated.

The fiber-optic connector according to this invention comprises a fiber holding clip that is pretensioned in the course of introduction into the connector housing through an axial offset in such a way that the fiber-optic cable end remains biased in an abutting fashion against a stop or a complementary element in the event of length variations. The particularly simple fixing of the fiber-optic cable end by the fiber holding clip is thereby additionally utilized to compensate for length variations as well.

If the fiber holding clip is of U-shaped design, it is particularly advantageous for one limb of the U, likewise of U-shaped design, to pierce the sheath of the fiber-optic cable end from both sides, while the second limb is deflected towards the fiber-optic cable end during introduction of the fiber holding clip and, consequently, ensures the necessary pretensioning of the fiber holding clip. If the length of the cable between the first limb and the fiber end then becomes shorter, the pretensioning of the fiber holding clip opposes the shortening so that the first limb is biased in the direction towards the stop for the fiber end.

The opening for the first limb of the fiber holding clip is designed in such a way that axial movement of the limb for the purpose of length compensation is possible, and that, at the same time, overstretching of the elastic fiber holding clip is prevented in the case of strain relief on the fiber.

BRIEF DESCRIPTION OF THE DRAWINGS

FIG. 1 shows a plan view of an unequipped fiber-optic connector with fiber holding clip in the pre-latching position;

FIG. 2 shows a cross-section through FIG. 1 along the section line A—A and a fiber-optic cable end;

DETAILED DESCRIPTION OF THE PREFERRED EMBODIMENT

Figure 3:
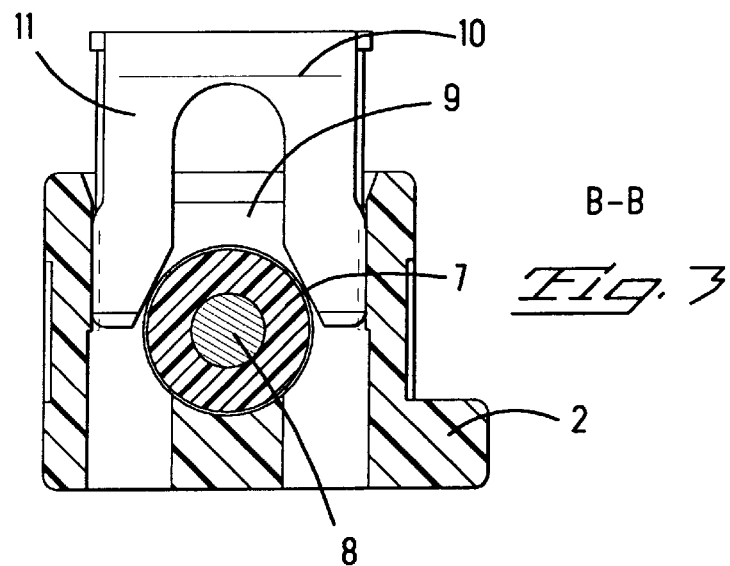
FIG. 3 shows a cross-section through FIG. 2 along the section line B—B with the fiber end already introduced.

FIG. 1 illustrates a fiber-optic connector 1 according to the present invention. The fiber-optic connector 1 comprises a transparent connector housing 2 with a cable insertion end 3 and a front end 4. As can be discerned from FIG. 2, the transparent connector housing 2 has a fiber receptacle 5, which begins at the cable insertion end 3 and ends as a blind hole shortly before the front end 4. This fiber receptacle 5 has stepped diameters along the length. The diameter at a step 12 at the blind end (corresponding to the front end 4) of the fiber receptacle 5 corresponds to the diameter of an optical waveguide 8 to be inserted. A fiber-optic cable end 6 is likewise illustrated in FIG. 2 showing the insulating sheath 7 and the optical waveguide 8.

The connector housing 2 has an opening 9 which extends transversely with respect to the fiber receptacle 5 and is connected thereto. A fiber holding clip 10 having a first limb 11 and a second limb 13 can be introduced through this opening 9 into the connector housing 2. As can be discerned in FIG. 2, the fiber holding clip 10 is of U-shaped design. The limb 11 on the cable side 5 is likewise of U-shaped design with two limbs (FIG. 3). These two limbs pierce the insulating sheath 7 of the fiber-optic cable end 6. As a result, the fiber-optic cable end 6 will be retained in the fiber receptacle hole 5 of the connector housing 2.

The fiber holding clip 10 also includes the second limb 13. This limb 13 also has two parts, which each have a latching lug 14. These two parts are spaced apart sufficiently to allow the fiber cable to pass therebetween and are oriented approximately perpendicular to the first limb 11. When the fiber holding clip 10 is lowered into the opening 9, the latching lugs 14 slide along an inclination 15 formed in the connector housing 2 along opening 9. As a result, the limbs 13 are deflected towards the front end 4 of the connector. The fiber holding clip 10 is now.

The termination of a fiber cable proceeds as follows: Firstly, the insulating sheath 7 is removed from regions of the fiber-optic cable end 6. The optical waveguide 8 is then introduced into the fiber receptacle 5 in gel matching a refractive index. When the free end of the optical waveguide 8 strikes against the stop 12, the fiber holding clip 10 is brought into its end latching position.

Figure 4:
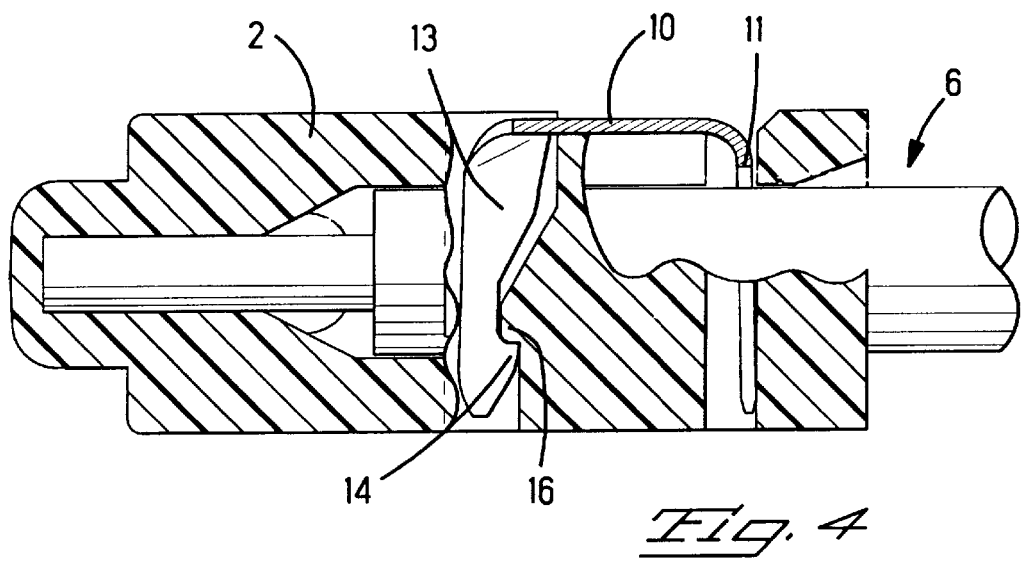
FIG. 4 shows a corresponding cross-section along the line A—A with the fiber holding clip in the end latch state and the fiber-optic cable end introduced.
Figure 5:
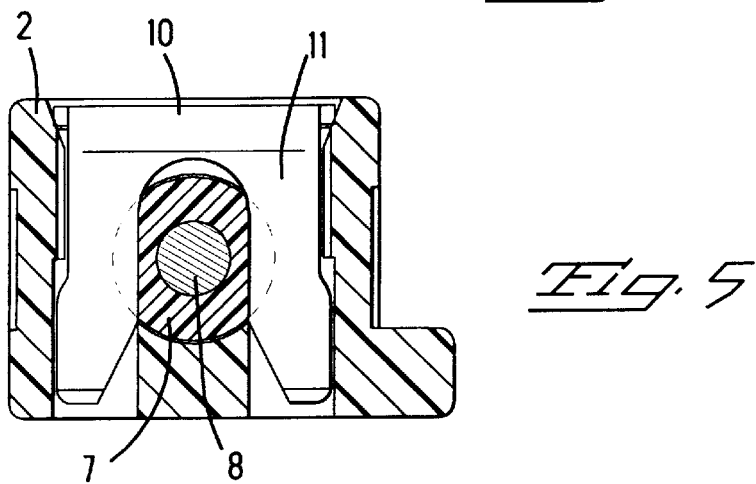
FIG. 5 shows a corresponding cross-section along line B—B in the end latching position of the fiber holding clip and with the fiber-optic cable end introduced.

If the length of the optical fiber between the stop 12 and the first limbs 11 becomes shorter, pretensioning of the fiber holding clip 10 means that the limb 11 is being biased towards the stop 12 at the blind end of the fiber receptacle 5. Consequently, the fiber-optic cable end is also moved towards this side and any change in length will be compensated for. The distance X in FIG. 2 defines the magnitude of the pretensioning of the fiber holding clip 10. FIGS. 4 and 5 then illustrate the fiber holding clip 10 in its end latching position in the connector housing 2.

FIG. 5 reveals how the limbs 11 pierce the insulating sheath 7 of the fiber-optic cable end 6. The latching hook 14 of the end limbs 13 of the fiber holding clip 10 latches behind the latching lug 16 on the connector housing 2. As a result, the fiber holding clip 10 is latched in the connector housing 2. In the region of the first limb 11, the opening 9 is designed in such a way that axial displacement of the limb 11 in the opening 9 is possible, at least by the amount by which the second limb 13 is pretensioned with respect to the first limb 11.

The arrangement according to the invention makes it possible to compensate for length variations of the fiber-optic cable end between the limb 11, with which the fiber-optic cable end is retained in the connector housing, and the end surface of the optical waveguide.

What is claimed is:

1. A fiber-optic connector comprising a connector housing having a fiber receptacle for receiving a fiber-optic cable end having an insulating sheath that surrounds an optical waveguide, the connector housing further including an opening which extends transversely with respect to the fiber receptacle and communicates therewith, and a fiber holding clip, to be introduced through the opening in order to retain the fiber-optic cable end within the fiber receptacle, and to exert an axial force to the fiber as a result of pretensioning the holding clip during introduction, in such a way that the fiber-optic cable end is biased axially to compensate for length variations.

2. The fiber-optic connector according to claim 1, wherein that the fiber holding clip is of U-shaped design and one limb pierces the sheath of the fiber-optic cable end, while the second limb is deflected towards the end of the connector during introduction of the fiber holding clip.

3. The fiber-optic connector according to claim 2, wherein an inclined plane is provided on the connector housing, along which plane the second limb is forcibly guided in the course of introduction and is thereby deflected towards the end of the connector.

4. The fiber-optic connector according to claim 1, wherein latching lugs are provided on the connector housing and latching hooks are provided on the fiber holding clip, for the purpose of latching to one another in an end latching position of the fiber holding clip.

5. The fiber-optic connector according to claim 1, wherein the opening for the first limb is designed in such a way that axial play of the limb in the opening is possible.

6. The fiber-optic connector according to claim 1, wherein the fiber holding clip assumes, in the connector housing, a pre-latching position, in which the fiber-optic cable end can be introduced, and an end latching position, in which the fiber-optic cable end is fastened in the connector housing.

7. The fiber-optic connector according to claim 1, wherein the fiber receptacle hole is a blind hole in which the fiber-optic cable end is positioned against a stop.

8. The fiber-optic connector according to claim 1, wherein the fiber receptacle hole is a through hole through which the fiber-optic cable end makes contact with a contact-making partner.

\* \* \* \* \*